Figure 1:
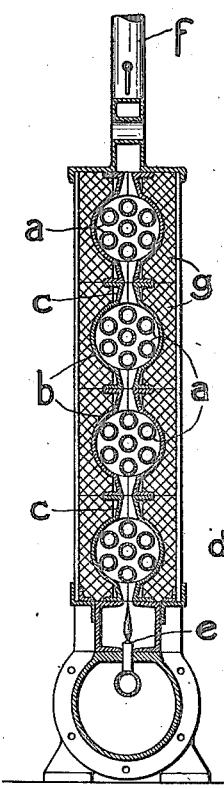

E. HAEFELY.
HEATER FOR CENTRAL HEATING SYSTEMS.
APPLICATION FILED SEPT. 15, 1916.

1,270,514.

Patented June 25, 1918.

INVENTOR:
EMIL HAEFELY
BY:
ATTORNEY.

UNITED STATES PATENT OFFICE.

EMIL HAEFELY, OF BASEL, SWITZERLAND.

HEATER FOR CENTRAL HEATING SYSTEMS.

1,270,514.  Specification of Letters Patent.  Patented June 25, 1918.

Application filed September 15, 1916. Serial No. 120,263.

*To all whom it may concern:*

Be it known that I, EMIL HAEFELY, a citizen of the Swiss Republic, and resident of Basel, Switzerland, have invented new and useful Improvements in Heaters for Central Heating Systems, of which the following is a full, clear, and exact specification.

This invention relates to heaters with horizontally disposed heating elements, for use in central heating sytems employing water, oil, air, steam or other suitable heat-transmitting medium.

The heaters hitherto known for use in central heating systems have the disadvantage that the heating gases are only utilized very imperfectly. This is particularly the case in heaters having horizontally arranged heating pipes, wherein for example the utilization of the heat is particularly defective because the hot gases frequently flow around such pipes only in broad upward streams. The path for the heating gases can be artificially extended by the insertion of baffles, and the utilization of the heat can be improved to some extent in this way. At the same time however, the arrangement is thereby made more complicated.

According to the improvements forming the subject of the present invention, the central heater is composed of a heat source and independent superimposed and interconnected heating elements for a heat transmitting medium, such as water, oil, air, steam and so forth, placed above said heat source and constituting each a unit structure comprising a separate circumferential casing and a bundle of separate heating pipes therein, whereby the casings of the heating elements have longitudinal upper and lower connecting throats serving as assembling connectors between the superimposed heating elements as well as contractors for the upward flowing hot gas stream from the heat source to cause the same to be distributed over all the heating pipes of the bundle. The pipe bundles of the superimposed heating elements are interconnected at their ends by hollow connecting pieces so as to form in known manner a continuous serpentine path for the heat transmitting fluid. In this manner the heating gases are caused to flow only while in the casings of the heating elements, in streams distributed in all directions around the separate heating pipes, whereby they are themselves broken up into separate streams and are enabled to act as completely as possible upon the heating pipes because they flow around all the heating pipes of the several heating elements in an approximately equal degree. Furthermore, the number of the heating elements and thus the capacity of the heater can readily be varied at any time by simply adding more or less heating elements, without changing those in use.

The pipes of the heating elements are preferably of round section, but they may be formed like the known heating elements, with ribs or otherwise.

The heating can be effected by any of the known methods by means of burning wood or coal, or better by means of gas. An electric heating device can also be employed as the source of heat.

Figure 2:
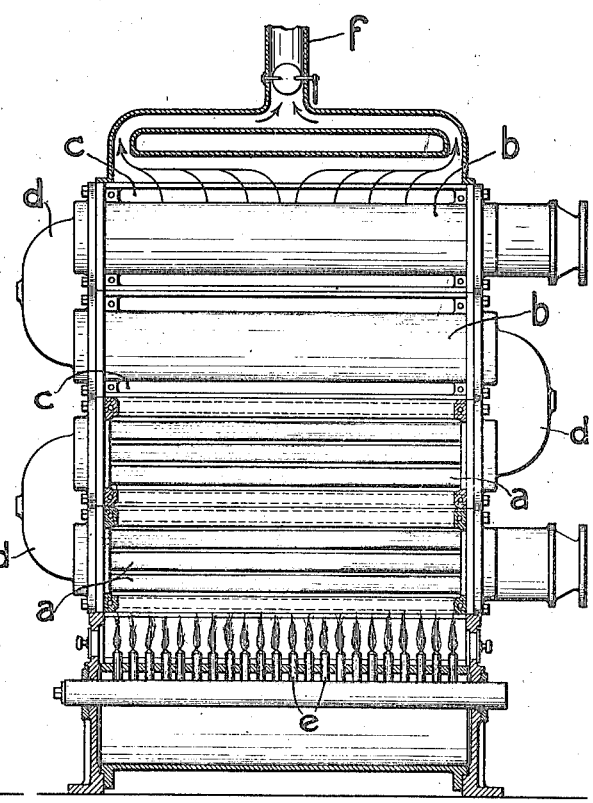

The accompanying drawing shows by way of example one form of construction of the heater forming the subject of the invention, Figure 1 being a cross section of the heater and Fig. 2 a side elevation partly in section.

In the construction illustrated the heater has four similar heating-pipe elements constituting independent unit structures and which are horizontally disposed one above another. Each of these elements consists of a bundle of horizontal heating pipes $a$ and a circumferential casing $b$ inclosing the bundle of pipes, each casing being formed both above and below with longitudinal connecting throats $c$ serving in the first time as flange connectors between the superimposed casings $b$, but having also a further purpose hereinafter described. At the ends each casing $b$ is closed by end plates into which the heating pipes $a$ are rolled or welded. The heating elements are connected together alternately at the ends by hollow undivided bends $d$, whose passageway is of the same cross section as the sum of the cross sections of the pipes of each heating element, the connection by means of the bends being such that the medium to be heated (water, oil, air and so forth) will pass in a zigzag path successively through all of the heating elements, but will be divided up in consequence of the bundles of pipes in these elements into a number of separate streams while passing therethrough.

At the base of the heater is arranged the source of the heat. This consists in the example shown, of a row of gas burners $e$. The hot gases rising up from these burners pass upward vertically with the natural draft, flowing over all of the heating elements successively from the bottom to the top, and enveloping in their flow all of the heating pipes $a$, and passing out at the top through the escape flue $f$. In their flow the hot gases enter the casing $b$ of each heating element through the lower connecting throat $c$ serving as contractors to contract the gas stream, where in consequence of this contraction they come into contact with the middle as well as the outer pipes of the bundle in said casing so that they are divided up into several streams of gas by the heating pipes $a$, enveloping these pipes equally, then after this subdivision become reunited and caused to pass in a contracted stream into the next heating element. The spreading out or sub-dividing of the heating gases in the casing $b$ of the heating elements may be assisted in some cases by means of separating material inserted between the pipes.

The heating elements are preferably insulated (lagged) externally to prevent loss of heat. For this purpose the casing $b$ of each heating element is provided with an insulating covering $g$. Such a covering can also be provided for the heating chamber in which the gas burners $e$ are arranged.

According to the drawing the casings $b$ of the heating elements have in general a cylindrical form; other forms are obviously possible however for these casings.

What I claim is:

A central heater composed of a heat source and independent superimposed and interconnected heating elements for a heat transmitting medium, such as water, oil, air, steam and so forth, placed above said heat source and constituting each a unit structure comprising a separate circumferential casing and a bundle of separate heating pipes therein the casings of the heating elements having longitudinal upper and lower connecting throats serving as assembling connectors between the superimposed heating elements as well as contractors for the upward flowing hot gas stream from the heat source to cause the same to be distributed over all the heating pipes of the bundle, in combination with hollow terminal interconnecting pieces for the pipe bundles of the heating elements, substantially as described.

In witness whereof I have hereunto signed my name this 24th day of August 1916, in the presence of two subscribing witnesses.

EMIL HAEFELY.

Witnesses:
AMAND BRAUER,
JOSEF SÜTTERLIN.